US009201599B2

United States Patent

Nguyen et al.

(10) Patent No.: US 9,201,599 B2

(45) Date of Patent: Dec. 1, 2015

(54) SYSTEM AND METHOD FOR TRANSMITTING DATA IN STORAGE CONTROLLERS

(75) Inventors: Huy T. Nguyen, Laguna Hills, CA (US); Leon A. Krantz, Mission Viejo, CA (US); William W. Dennin, Mission Viejo, CA (US)

(73) Assignee: MARVELL INTERNATIONAL LTD., Hamilton (BM)

( * ) Notice: Subject to any disclaimer, the term of this patent is extended or adjusted under 35 U.S.C. 154(b) by 1192 days.

(21) Appl. No.: 10/894,143

(22) Filed: Jul. 19, 2004

(65) Prior Publication Data

US 2006/0015774 A1 Jan. 19, 2006

(51) Int. Cl.
*G06F 11/00* (2006.01)
*G06F 3/06* (2006.01)

(52) U.S. Cl.
CPC ............ *G06F 3/0613* (2013.01); *G06F 3/0656* (2013.01); *G06F 3/0659* (2013.01); *G06F 3/0676* (2013.01)

(58) Field of Classification Search
CPC ... G06F 3/0613; G06F 3/0659; G06F 3/0676; G06F 3/0656
USPC .............................................................. 710/6
See application file for complete search history.

(56) References Cited

U.S. PATENT DOCUMENTS 3,800,281 A 3/1974 Devore et al.
3,988,716 A 10/1976 Fletcher et al.
4,001,883 A 1/1977 Strout et al.
4,016,368 A 4/1977 Apple, Jr.
4,050,097 A 9/1977 Miu et al.
4,080,649 A 3/1978 Calle et al.
4,156,867 A 5/1979 Bench et al.
4,225,960 A 9/1980 Masters (Continued)

FOREIGN PATENT DOCUMENTS

EP 0528273 2/1993
EP 0622726 11/1994

(Continued)

OTHER PUBLICATIONS

International Search Report from the International Searching Authority dated Apr. 19, 2006 for Application No. PCT/US2005/024774; 5 pages.

(Continued)

*Primary Examiner* — Zachary K Huson
*Assistant Examiner* — Brooke Taylor

(57) ABSTRACT

A method and system for transferring frames from a storage device to a host system via a controller is provided. The method includes transferring frames from a transport module to a link module; and sending an acknowledgment to the transport module, wherein the link module sends the acknowledgement to the transport module and it appears to the transport module as if the host system sent the acknowledgement. The frames in the controller are tracked by creating a status entry indicating that a new frame is being created; accumulating data flow information, while a connection to transfer the frame is being established by a link module; and updating frame status as frame build is completed, transferred, and acknowledged. The controller includes, a header array in a transport module of the controller, wherein the header array includes plural layers and one of the layers is selected to process a frame.

16 Claims, 12 Drawing Sheets

TRANSFER DATA TO HOST VIA LINK MODULE S300
SEND ACK FRAME S301
VACATE FRAME ENTRY S302
ACCUMLATE DATA FLOW INFORMATION S303
RELEASE INFORMATION TO BC 108 AND WAIT FOR ACK/NAK BALANCE CONDITION S304

(56) References Cited

U.S. PATENT DOCUMENTS 4,275,457 A 6/1981 Leighou et al.
4,390,969 A 6/1983 Hayes
4,451,898 A 5/1984 Palermo et al.
4,486,750 A 12/1984 Aoki
4,500,926 A 2/1985 Yoshimaru et al.
4,587,609 A 5/1986 Boudreau et al.
4,603,382 A 7/1986 Cole
4,625,321 A 11/1986 Pechar et al.
4,667,286 A 5/1987 Young et al.
4,777,635 A 10/1988 Glover
4,805,046 A 2/1989 Kuroki et al.
4,807,116 A 2/1989 Katzman et al.
4,807,253 A 2/1989 Hagenauer et al.
4,809,091 A 2/1989 Miyazawa et al.
4,811,282 A 3/1989 Masina
4,812,769 A 3/1989 Agoston
4,860,333 A 8/1989 Bitzinger et al.
4,866,606 A 9/1989 Kopetz
4,881,232 A 11/1989 Sako et al.
4,920,535 A 4/1990 Watanabe et al.
4,949,342 A 8/1990 Shimbo et al.
4,970,418 A 11/1990 Masterson
4,972,417 A 11/1990 Sako et al.
4,975,915 A 12/1990 Sako et al.
4,989,190 A 1/1991 Kuroe et al.
5,014,186 A 5/1991 Chisholm
5,023,612 A 6/1991 Liu
5,027,357 A 6/1991 Yu et al.
5,050,013 A 9/1991 Holsinger
5,051,998 A 9/1991 Murai et al.
5,068,755 A 11/1991 Hamilton et al.
5,068,857 A 11/1991 Yoshida
5,072,420 A 12/1991 Conley et al.
5,088,093 A 2/1992 Storch et al.
5,109,500 A 4/1992 Iseki et al.
5,117,442 A 5/1992 Hall
5,127,098 A 6/1992 Rosenthal et al.
5,133,062 A 7/1992 Joshi et al.
5,136,592 A 8/1992 Weng
5,146,585 A 9/1992 Smith, III
5,157,669 A 10/1992 Yu et al.
5,162,954 A 11/1992 Miller et al.
5,193,197 A 3/1993 Thacker
5,204,859 A 4/1993 Paesler et al.
5,218,564 A 6/1993 Haines et al.
5,220,569 A 6/1993 Hartness
5,237,593 A 8/1993 Fisher et al.
5,243,471 A 9/1993 Shinn
5,249,271 A 9/1993 Hopkinson
5,257,143 A 10/1993 Zangenehpour
5,261,081 A 11/1993 White et al.
5,271,018 A 12/1993 Chan
5,274,509 A 12/1993 Buch
5,276,564 A 1/1994 Hessing et al.
5,276,662 A 1/1994 Shaver, Jr. et al.
5,276,807 A 1/1994 Kodama et al.
5,276,813 A * 1/1994 Elliott et al. ...................... 710/9
5,280,488 A 1/1994 Glover et al.
5,285,327 A 2/1994 Hetzler
5,285,451 A 2/1994 Henson et al.
5,301,333 A 4/1994 Lee
5,307,216 A 4/1994 Cook et al.
5,315,708 A 5/1994 Eidler et al.
5,339,443 A 8/1994 Lockwood
5,361,266 A 11/1994 Kodama et al.
5,361,267 A 11/1994 Godiwala et al.
5,408,644 A 4/1995 Schneider et al.
5,420,984 A 5/1995 Good et al.
5,428,627 A 6/1995 Gupta
5,440,751 A 8/1995 Santeler et al.
5,465,343 A 11/1995 Henson et al.
5,487,170 A 1/1996 Bass et al.
5,488,688 A 1/1996 Gonzales et al.
5,491,701 A 2/1996 Zook
5,500,848 A 3/1996 Best et al.
5,506,989 A 4/1996 Boldt et al.
5,507,005 A 4/1996 Kojima et al.
5,519,837 A 5/1996 Tran
5,523,903 A 6/1996 Hetzler et al.
5,544,180 A 8/1996 Gupta
5,544,346 A 8/1996 Amini
5,546,545 A 8/1996 Rich
5,546,548 A 8/1996 Chen et al.
5,563,896 A 10/1996 Nakaguchi
5,572,148 A 11/1996 Lytle et al.
5,574,867 A 11/1996 Khaira
5,581,715 A 12/1996 Verinsky et al.
5,583,999 A 12/1996 Sato et al.
5,592,404 A 1/1997 Zook
5,600,662 A 2/1997 Zook et al.
5,602,857 A 2/1997 Zook et al.
5,615,190 A 3/1997 Best et al.
5,623,672 A 4/1997 Popat
5,626,949 A 5/1997 Blauer et al.
5,627,695 A 5/1997 Prins et al.
5,640,602 A 6/1997 Takase
5,649,230 A 7/1997 Lentz
5,664,121 A 9/1997 Cerauskis
5,689,656 A 11/1997 Baden et al.
5,691,994 A 11/1997 Acosta et al.
5,692,135 A 11/1997 Alvarez, II et al.
5,692,165 A 11/1997 Jeddeloh et al.
5,719,516 A 2/1998 Sharpe-Geisler
5,729,718 A 3/1998 Au
5,740,466 A 4/1998 Geldman
5,745,793 A 4/1998 Atsatt et al.
5,754,759 A 5/1998 Clarke et al.
5,758,188 A 5/1998 Appelbaum et al.
5,784,569 A 7/1998 Miller et al.
5,794,073 A 8/1998 Ramakrishnan et al.
5,801,998 A 9/1998 Choi
5,818,886 A 10/1998 Castle
5,822,142 A 10/1998 Hicken
5,831,922 A 11/1998 Choi
5,832,310 A 11/1998 Morrissey et al.
5,835,930 A 11/1998 Dobbek
5,838,895 A 11/1998 Kim et al.
5,841,722 A 11/1998 Willenz
5,844,844 A 12/1998 Bauer et al.
5,850,422 A 12/1998 Chen
5,854,918 A 12/1998 Baxter
5,890,207 A 3/1999 Sne et al.
5,890,210 A 3/1999 Ishii et al.
5,907,717 A 5/1999 Ellis
5,912,906 A 6/1999 Wu et al.
5,925,135 A 7/1999 Trieu et al.
5,937,435 A 8/1999 Dobbek et al.
5,950,223 A 9/1999 Chiang et al.
5,968,180 A 10/1999 Baco
5,983,293 A 11/1999 Murakami
5,991,911 A 11/1999 Zook
6,029,226 A 2/2000 Ellis et al.
6,029,250 A 2/2000 Keeth
6,041,417 A 3/2000 Hammond et al.
6,065,053 A 5/2000 Nouri et al.
6,067,206 A 5/2000 Hull et al.
6,070,200 A 5/2000 Gates et al.
6,078,447 A 6/2000 Sim
6,081,849 A 6/2000 Born et al.
6,092,231 A 7/2000 Sze
6,094,320 A 7/2000 Ahn
6,124,994 A 9/2000 Malone, Sr.
6,134,063 A 10/2000 Weston-Lewis et al.
6,157,984 A 12/2000 Fisher
6,178,486 B1 1/2001 Gill et al.
6,192,499 B1 2/2001 Yang
6,201,555 B1 3/2001 Kamentser et al.
6,201,655 B1 3/2001 Watanabe et al.
6,223,303 B1 4/2001 Billings et al.
6,256,685 B1 * 7/2001 Lott ................................ 710/52
6,279,089 B1 8/2001 Schibilla et al.
6,297,926 B1 10/2001 Ahn
6,330,626 B1 12/2001 Dennin et al.
6,381,659 B2 4/2002 Proch et al.

(56) References Cited

U.S. PATENT DOCUMENTS

| | | | | |
|---|---|---|---|---|
| 6,401,149 | B1 | 6/2002 | Dennin et al. | |
| 6,418,468 | B1 | 7/2002 | Ahlstrom et al. | |
| 6,418,488 | B1 | 7/2002 | Chilton et al. | |
| 6,470,461 | B1 | 10/2002 | Pinvidic et al. | |
| 6,487,531 | B1 | 11/2002 | Tosaya et al. | |
| 6,487,631 | B2 | 11/2002 | Dickinson et al. | |
| 6,490,635 | B1 | 12/2002 | Holmes | |
| 6,502,189 | B1 | 12/2002 | Westby | |
| 6,513,085 | B1 * | 1/2003 | Gugel et al. | 710/305 |
| 6,530,000 | B1 | 3/2003 | Krantz et al. | |
| 6,574,676 | B1 | 6/2003 | Megiddo | |
| 6,584,584 | B1 | 6/2003 | Smith | |
| 6,662,334 | B1 | 12/2003 | Stenfort | |
| 6,735,658 | B1 * | 5/2004 | Thornton | 710/305 |
| 6,826,650 | B1 | 11/2004 | Krantz et al. | |
| 6,965,725 | B1 | 11/2005 | Ichikawa et al. | |
| 6,965,956 | B1 * | 11/2005 | Herz et al. | 710/74 |
| 7,035,952 | B2 * | 4/2006 | Elliott et al. | 710/300 |
| 7,200,790 | B2 | 4/2007 | Sharma et al. | |
| 2001/0044873 | A1 | 11/2001 | Wilson et al. | |
| 2002/0071485 | A1 * | 6/2002 | Caglar et al. | 375/240.01 |
| 2002/0188769 | A1 * | 12/2002 | Swidler et al. | 710/8 |
| 2003/0012223 | A1 | 1/2003 | Chappell et al. | |
| 2003/0037225 | A1 | 2/2003 | Deng et al. | |
| 2003/0126322 | A1 | 7/2003 | Micalizzi et al. | |
| 2003/0167373 | A1 | 9/2003 | Winters et al. | |
| 2004/0054813 | A1 * | 3/2004 | Boucher et al. | 709/250 |
| 2004/0111660 | A1 | 6/2004 | Kim et al. | |
| 2004/0139365 | A1 * | 7/2004 | Hosoya | 714/5 |
| 2004/0223506 | A1 * | 11/2004 | Sato | 370/428 |
| 2004/0252672 | A1 * | 12/2004 | Nemazie | 370/351 |
| 2005/0027900 | A1 * | 2/2005 | Pettey | 710/22 |
| 2005/0102411 | A1 | 5/2005 | Haydock | |
| 2005/0235072 | A1 * | 10/2005 | Smith et al. | 710/22 |
| 2006/0031605 | A1 * | 2/2006 | Kao et al. | 710/23 |

FOREIGN PATENT DOCUMENTS

| | | |
|---|---|---|
| EP | 0718827 | 6/1996 |
| GB | 2285166 | 6/1995 |
| JP | 63 075927 | 4/1988 |
| JP | 63-292462 | 11/1988 |
| JP | 01-315071 | 12/1989 |
| JP | 03183067 | 8/1991 |
| WO | 98/14861 | 4/1998 |
| WO | WO 00/67107 | 11/2000 |

OTHER PUBLICATIONS

Written Opinion from the International Searching Authority dated Apr. 19, 2006 for Application No. PCT/US2005/024774; 6 pages.

International Search Report from the International Searching Authority dated Apr. 13, 2006 for Application No. PCT/US2005/024910; 5 pages.

Written Opinion from the International Searching Authority dated Apr. 13, 2006 for Application No. PCT/US2005/024910; 6 pages.

PCT International Search Report, Doc. No. PCT/US00/15084, Dated Nov. 15, 2000, 2 Pages.

Blathut R. Digital Transmission of Information (Dec. 4, 1990), pp. 429-430.

Hwang, Kai and Briggs, Faye A., "Computer Architecture and Parallel Processing" pp. 156-164.

Zeidman, Bob, "Interleaving DRAMS for faster access", System Design ASIC & EDA, pp. 24-34 (Nov. 1993).

P.M. Bland et. al. Shared Storage Bus Circuitry, IBM Technical Disclosure Bulletin, vol. 25, No. 4, Sep. 1982, pp. 2223-2224.

PCT search report for PCT/US00/07780 mailed Aug. 2, 2000, 4 Pages.

PCT Search Report for PCT/US01/22404, mailed Jan. 29, 2003, 4 Pages.

* cited by examiner

Transmit:
- Data Frame Header
- Good Transmit Response Frame
- Transfer Ready Frame (Receive path)
- Good Receive Response Frame (Receive path)

Receive:
Context Checking on Rx Data Frames

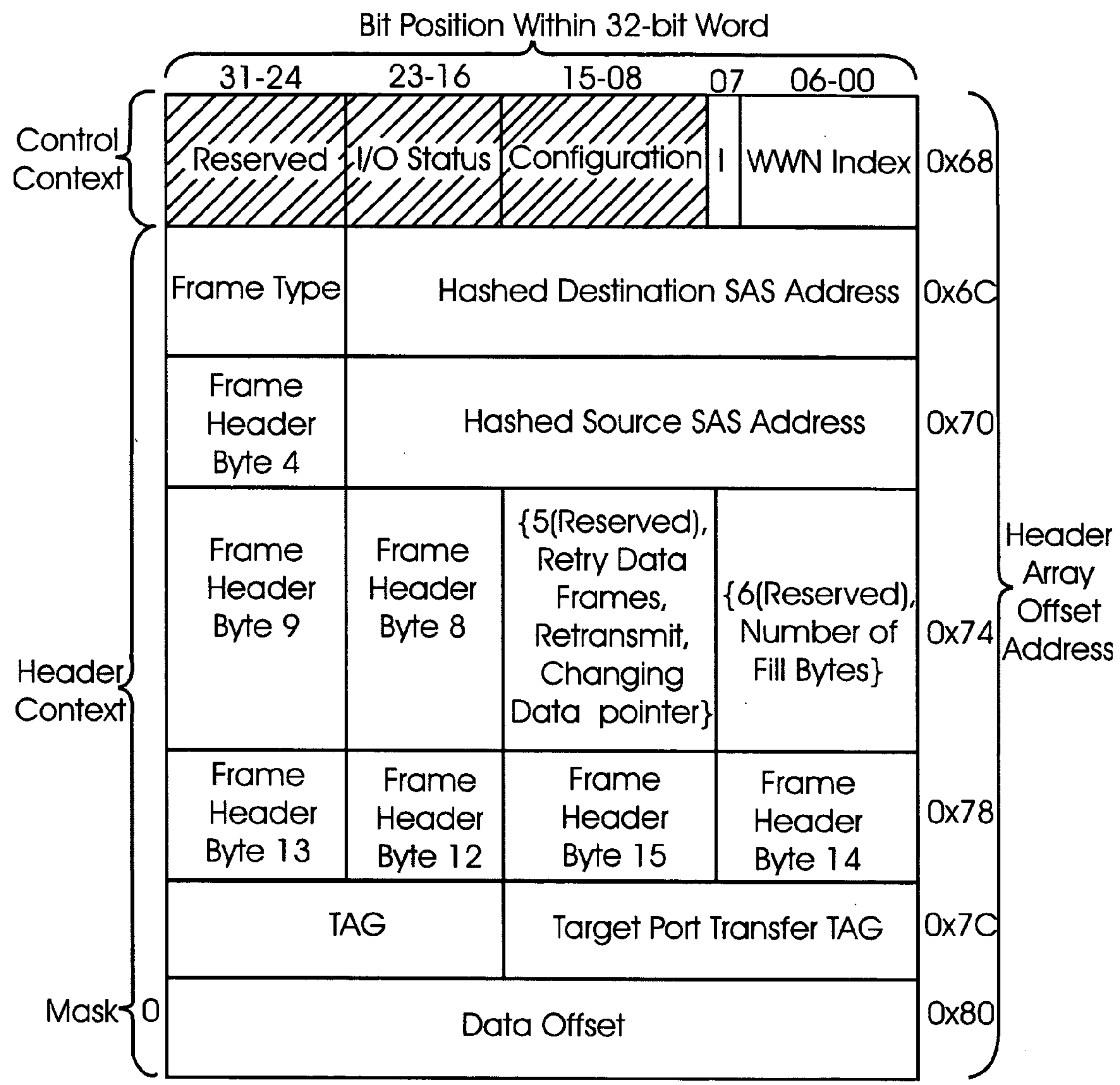
FIGURE 7-(1)

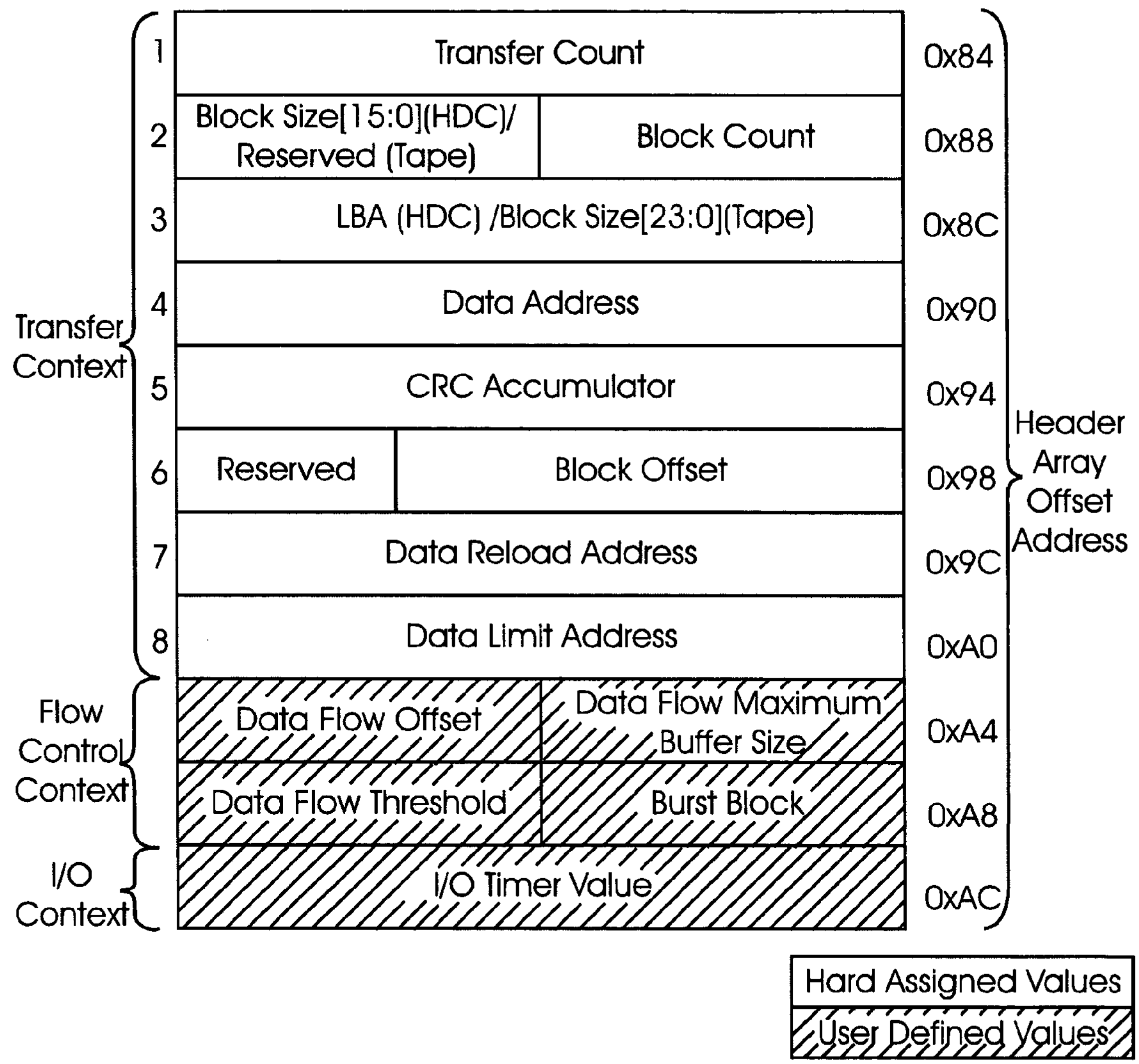
FIGURE 7-(2)

SYSTEM AND METHOD FOR TRANSMITTING DATA IN STORAGE CONTROLLERS

BACKGROUND OF THE INVENTION

1. Field Of the Invention

The present invention relates generally to storage device controllers, and more particularly, to efficiently reading and writing data.

2. Background

Conventional computer systems typically include several functional components. These components may include a central processing unit (CPU), main memory, input/output ("I/O") devices, and streaming storage devices (for example, tape drives) (referred to herein as "storage device").

In conventional systems, the main memory is coupled to the CPU via a system bus or a local memory bus. The main memory is used to provide the CPU access to data and/or program information that is stored in main memory at execution time. Typically, the main memory is composed of random access memory (RAM) circuits. A computer system with the CPU and main memory is often referred to as a host system.

The storage device is coupled to the host system via a controller that handles complex details of interfacing the storage device to the host system. Communications between the host system and the controller is usually provided using one of a variety of standard I/O bus interfaces.

Typically, when data is read from a storage device, a host system sends a read command to the controller, which stores the read command into a buffer memory. Data is read from the device and stored in the buffer memory.

Various standard interfaces are used to move data from host systems to storage devices. Fibre channel is one such standard. Fibre channel (incorporated herein by reference in its entirety) is an American National Standard Institute (ANSI) set of standards, which provides a serial transmission protocol for storage and network protocols such as HIPPI, SCSI, IP, ATM and others. Fibre channel provides an input/output interface to meet the requirements of both channel and network users.

Host systems often communicate with storage systems using the "PCI" bus interface. PCI stands for Peripheral Component Interconnect, a local bus standard that was developed by Intel Corporation®. The PCI standard is incorporated herein by reference in its entirety. Most modern computing systems include a PCI bus in addition to a more general expansion bus (e.g. the ISA bus). PCI is a 64-bit bus and can run at clock speeds of 33 or 66 MHz.

PCI-X is a standard bus that is compatible with existing PCI cards using the PCI bus. PCI-X improves the data transfer rate of PCI from 132 MBps to as much as 1 GBps. The PCI-X standard (incorporated herein by reference in its entirety) was developed by IBM®, Hewlett Packard Corporation® and Compaq Corporation® to increase performance of high bandwidth devices, such as Gigabit Ethernet standard and Fibre Channel Standard, and processors that are part of a cluster.

The iSCSI standard (incorporated herein by reference in its entirety) is based on Small Computer Systems Interface ("SCSI"), which enables host computer systems to perform block data input/output ("I/O") operations with a variety of peripheral devices including disk and tape devices, optical storage devices, as well as printers and scanners.

A traditional SCSI connection between a host system and peripheral device is through parallel cabling and is limited by distance and device support constraints. For storage applications, iSCSI was developed to take advantage of network architectures based on Fibre Channel and Gigabit Ethernet standards. iSCSI leverages the SCSI protocol over established networked infrastructures and defines the means for enabling block storage applications over TCP/IP networks. iSCSI defines mapping of the SCSI protocol with TCP/IP. The iSCSI architecture is based on a client/server model. Typically, the client is a host system such as a file server that issues a read or write command. The server may be a disk array that responds to the client request.

Serial ATA ("SATA") is another standard, incorporated herein by reference in its entirety that has evolved from the parallel ATA interface for storage systems. SATA provides a serial link with a point-to-point connection between devices and data transfer can occur at 150 megabytes per second.

Another standard that has been developed is Serial Attached Small Computer Interface ("SAS"), incorporated herein by reference in its entirety. The SAS standard allows data transfer between a host system and a storage device. SAS provides a disk interface technology that leverages SCSI, SATA, and fibre channel interfaces for data transfer. SAS uses a serial, point-to-point topology to overcome the performance barriers associated with storage systems based on parallel bus or arbitrated loop architectures.

Conventional controllers are not designed to efficiently handle high throughput that is required by new and upcoming standards. For example, conventional controllers do not keep track of frame status, from the time when a frame build occurs to the time when the frame is transmitted. Also, if an error occurs during frame transmission, conventional controllers are not able to process frames from a known point.

Conventional controllers often have poor performance because they wait for a host to acknowledge receipt of a frame. A host does this by sending an ACK (acknowledgement) frame or a "NAK" (non-acknowledgement frame). Often this delays frame processing because when a host receives a frame it may choose to acknowledge the frame immediately or after a significant amount of time.

Therefore, there is a need for a controller that can efficiently process data to accommodate high throughput rates.

SUMMARY OF THE INVENTION

A method for transferring frames from a storage device to a host system via a controller is provided. The method includes, transferring frames from a transport module to a link module; and sending an acknowledgment to the transport module, wherein the link module sends the acknowledgement to the transport module and it appears to the transport module as if the host system sent the acknowledgement.

The transport module vacates an entry for a frame after it receives the acknowledgement from the link module. Also, the transport module waits for an acknowledgement from the host system, after a last frame for a read command is transmitted to the host system.

In yet another aspect of the present invention, a method for tracking frames in a controller used for facilitating frame transfer between a host system and a storage device is provided. The method includes: creating a status entry indicating that a new frame is being created; accumulating data flow information, while a connection to transfer the frame is being established by a link module; and updating frame status as frame build is completed, transferred, and acknowledged.

The method further includes: determining if a frame has been lost after transmission; and using a known good frame build point to process the frame if it was lost in transmission.

In yet another aspect of the present invention, a method is provided for processing frames in a transmit path of a controller that is used to facilitate frame transfer between a storage device and host system. The method includes, loading a received frame's context to a header array; building a frame and selecting a header array for processing the frame; and saving the context to a different header array if the frame processing is complex.

In yet another aspect of the present invention, a method for processing frames in a receive path of a controller used for facilitating frame transfer between a storage device and a host system is provided. The method includes: loading a context of a received frame into an header array; verifying received frame header information; and sending Transfer Ready or Response frames to the host system using a frame header context.

In yet another aspect of the present invention, a controller for transferring frames between a storage device and a host system is provided. The controller includes a header array in a transport module of the controller, wherein the header array includes plural layers and one of the layers is selected to process a frame.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures:

FIGS. 7(1)-7(2) (referred to as FIG. 7) shows header array contents, according to one aspect of the present invention;

DETAILED DESCRIPTION OF THE PREFERRED EMBODIMENTS

Controller Overview:

To facilitate an understanding of the preferred embodiment, the general architecture and operation of a controller will initially be described. The specific architecture and operation of the preferred embodiment will then be described with reference to the general architecture.

Figure 1A:
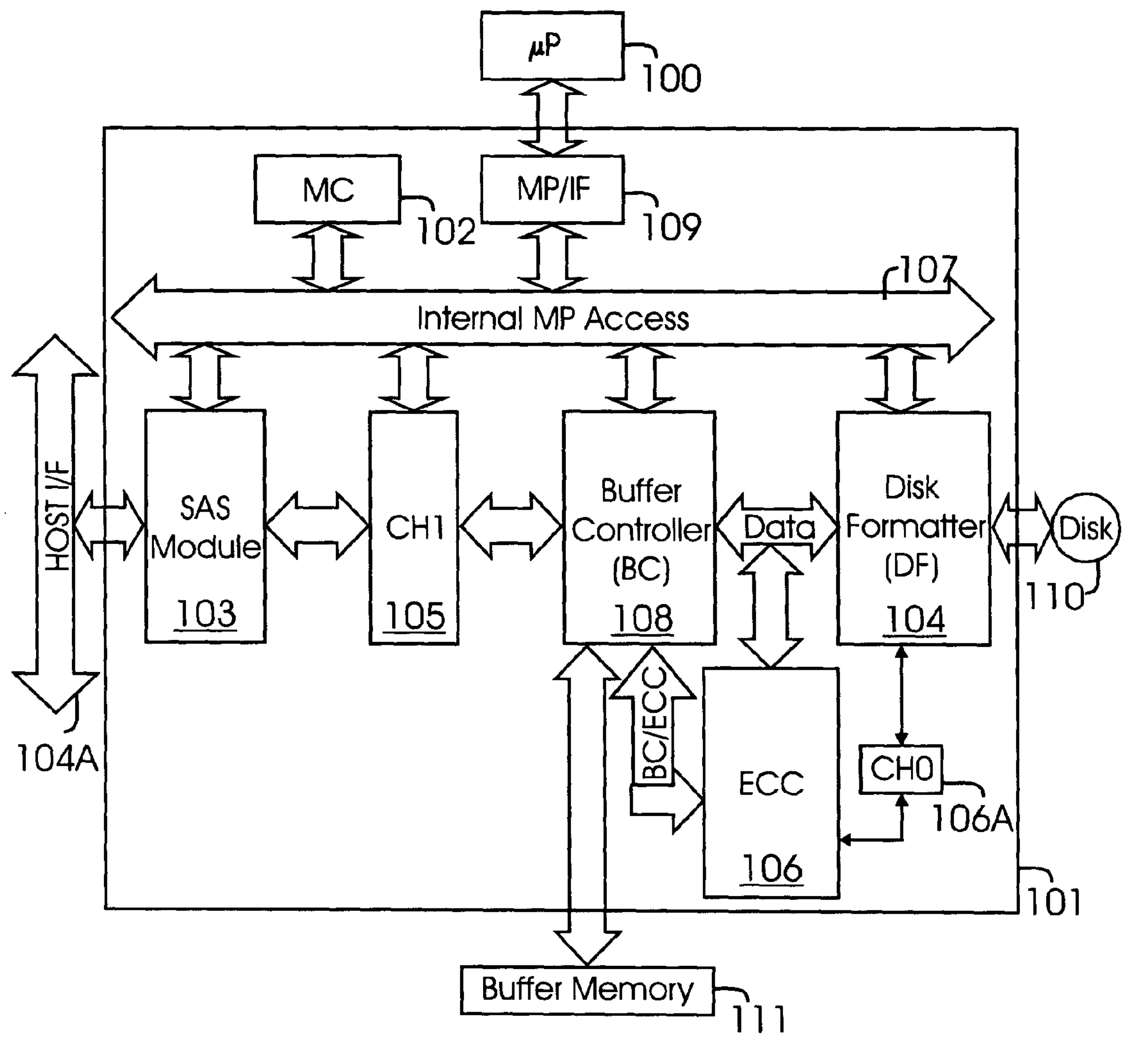
FIG. 1A shows an example of a storage drive system used with the adaptive aspects of the present invention.

FIG. 1A shows an example of a storage drive system (with an optical disk or tape drive), included in (or coupled to) a computer system. The host computer (not shown) and the storage device 110 (also referred to as disk 110) communicate via a port using a disk formatter "DF" 104. In an alternate embodiment (not shown), the storage device 110 is an external storage device, which is connected to the host computer via a data bus. The data bus, for example, is a bus in accordance with a Small Computer System Interface (SCSI) specification. Those skilled in the art will appreciate that other communication buses known in the art can be used to transfer data between the drive and the host system.

As shown in FIG. 1A, the system includes controller 101, which is coupled to buffer memory 111 and microprocessor 100. Interface 109 serves to couple microprocessor bus 107 to microprocessor 100 and a micro-controller 102 and facilitates transfer of data, address, timing and control information. A read only memory ("ROM") omitted from the drawing is used to store firmware code executed by microprocessor 100.

Controller 101 can be an integrated circuit (IC) that is comprised of various functional modules, which provide for the writing and reading of data stored on storage device 110. Buffer memory 111 is coupled to controller 101 via ports to facilitate transfer of data, timing and address information. Buffer memory 111 may be a double data rate synchronous dynamic random access memory ("DDR-SDRAM") or synchronous dynamic random access memory ("SDRAM"), or any other type of memory.

Disk formatter 104 is connected to microprocessor bus 107 and to buffer controller 108. A direct memory access ("DMA") DMA interface (not shown) is connected to microprocessor bus 107 and to a data and control port (not shown).

Buffer controller (also referred to as "BC") 108 connects buffer memory 111, channel one (CH1) logic 105, and error correction code ("ECC") module 106 to bus 107. Buffer controller 108 regulates data movement into and out of buffer memory 111.

CH1 logic 105 is functionally coupled to SAS module 103 that is described below in detail. CH1 Logic 105 interfaces between buffer memory 111 and SAS module 103. SAS module 103 interfaces with host interface 104A to transfer data to and from disk 110.

Data flow between a host and disk passes through buffer memory 111 via channel 0 (CH0)logic 106A. ECC module 106 generates ECC that is saved on disk 110 during a write operation and provides correction mask to BC 108 for disk 110 read operation.

The channels (CH0 106A and CH1 105 and Channel 2 (not shown) are granted arbitration turns when they are allowed access to buffer memory 111 in high speed burst write or read operations for a certain number of clocks. The channels use first-in-first out ("FIFO") type memories to store data that is in transit. Firmware running on processor 100 can access the channels based on bandwidth and other requirements.

To read data from device 110, a host system sends a read command to controller 101, which stores the read commands in buffer memory 111. Microprocessor 100 then reads the command out of buffer memory 111 and initializes the various functional blocks of controller 101. Data is read from device 110 and is passed to buffer controller 108.

To write data, a host system sends a write command to disk controller 101, which is stored in buffer 111. Microprocessor 100 reads the command out of buffer 111 and sets up the appropriate registers. Data is transferred from the host and is first stored in buffer 111, before being written to disk 110. CRC (cyclic redundancy check code) values are calculated based on a logical block address ("LBA") for the sector being written. Data is read out of buffer 111, appended with ECC code and written to disk 110.

Figure 1B:
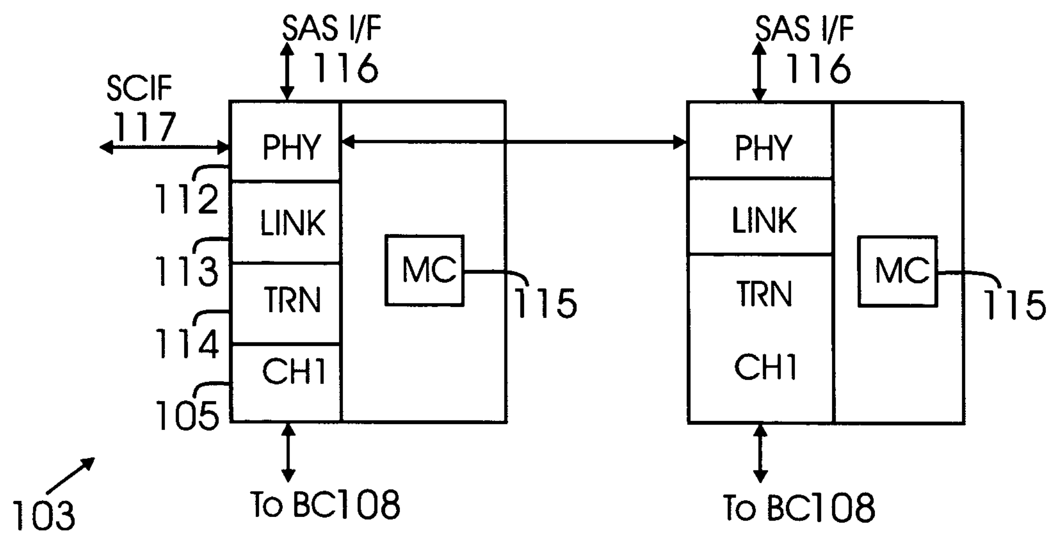
FIG. 1B shows a block diagram of a SAS module used in a controller, according to one aspect of the present invention.
Figure 1C:
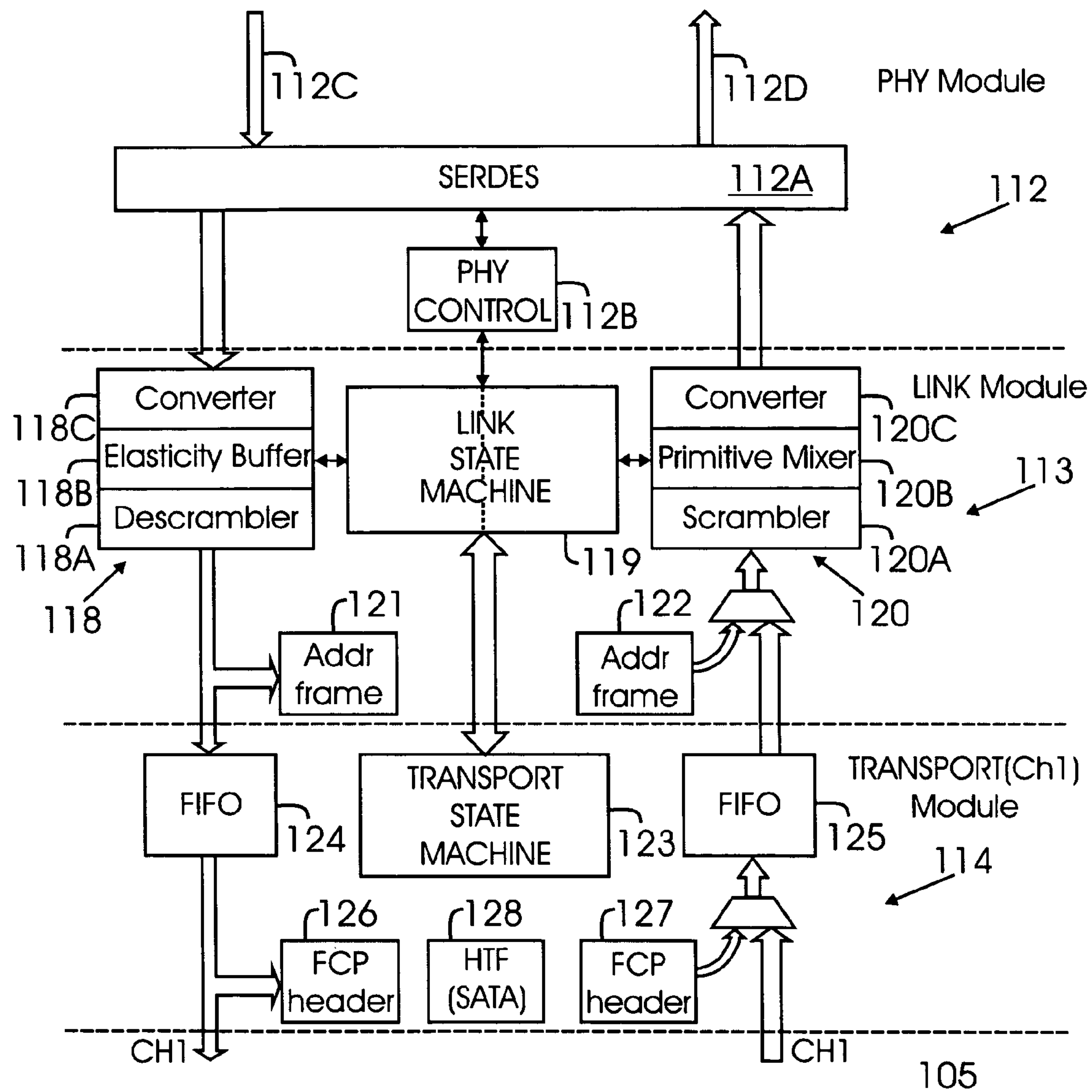
FIG. 1C shows a detailed block diagram of a SAS module, according to one aspect of the present invention.
Figure 1D:
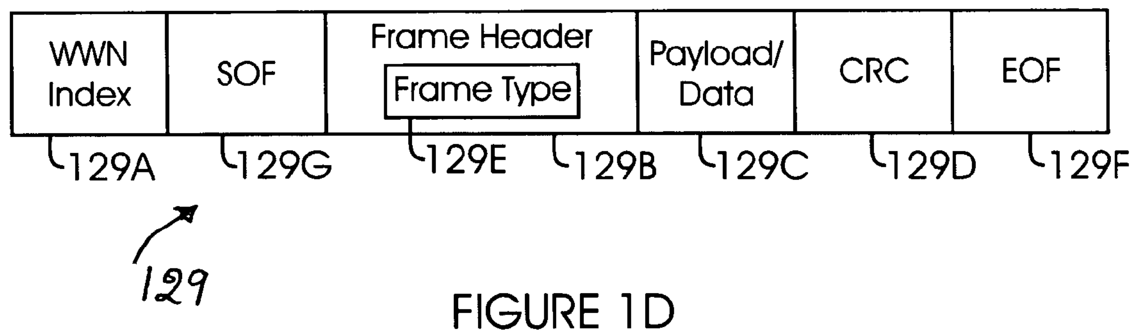
FIG. 1D shows a SAS frame that is received/transmitted using the SAS module according to one aspect of the present invention.

Frame Structure:

FIG. 1D shows a SAS frame 129 that is received/transmitted using SAS module 103. Frame 129 includes a WWN value 129A, a start of frame ("SOF") value 129G, a frame header 129B that includes a frame type field 129E, payload/data 129C, CRC value 129D and end of frame ("EOF") 129F. The SAS specification addresses all devices by a unique World Wide Name ("WWN") address.

Also, a frame may be an interlock or non-interlocked, specified by field 129E (part of frame header 129B). For an interlock frame, acknowledgement from a host is required for further processing, after the frame is sent to the host. Non-interlock frames are passed through to a host without host acknowledgement (up to 256 frames per the SAS standard).

SAS Module 103:

FIG. 1B shows a top level block diagram for SAS module 103 used in controller 101. SAS module 103 includes a physical ("PHY") module 112, a link module 113 and a transport module ("TRN") 114 described below in detail. A micro-controller 115 is used to co-ordinate operations between the various modules. A SAS interface 116 is also provided to the PHY module 112 for interfacing with a host and interface 117 is used to initialize the PHY module 112.

FIG. 1C shows a detailed block diagram of SAS module 103 with various sub-modules. Incoming data 112C is received from a host system, while outgoing data 112D is sent to a host system or another device/component.

PHY Module 112:

PHY module 112 includes a serial/deserializer ("SERDES") 112A that serializes encoded data for transmission 112D, and de-serializes received data 112C. SERDES 112A also recovers a clock signal from incoming data stream 112C and performs word alignment.

PHY control module 112B controls SERDES 112A and provides the functions required by the SATA standard.

Link Module 113:

Link module 113 opens and closes connections, exchanges identity frames, maintains ACK/NAK (i.e. acknowledged/not acknowledged) balance and provides credit control. As shown in FIG. 1C, link module 113 has a receive path 118 that receives incoming frames 112C and a transmit path 120 that assists in transmitting information 112D. Addresses 121 and 122 are used for received and transmitted data, respectively.

Receive path 118 includes a converter 118C for converting 10-bit data to 8-bit data, an elasticity buffer/primitive detect segment 118B that transfers data from a receive clock domain to a transmit block domain and decodes primitives. Descrambler module 118A unscrambles data and checks for cyclic redundancy check code ("CRC").

Transmit path 120 includes a scrambler 120A that generates CRC and scrambles (encodes) outgoing data; and primitive mixer module 120B that generates primitives required by SAS protocol/standard and multiplexes the primitives with the outgoing data. Converter 120C converts 8-bit data to 10-bit format.

Link module 113 uses plural state machines 119 to achieve the various functions of its sub-components. State machines 119 includes a receive state machine for processing receive frames, a transmit state machine for processing transmit frames, a connection state machine for performing various connection related functions and an initialization state machine that becomes active after an initialization request or reset.

Transport module 114:

Transport module 114 interfaces with CH1 105 and link module 113. In transmit mode, TRN module 114 receives data from CH1 105, loads the data (with fibre channel header (FCP) 127) in FIFO 125 and sends data to Link module 113 encapsulated with a header (129B) and a CRC value (129D). In receive mode, TRN module 114 receives data from link module 113 (in FIFO 124), and re-packages data (extracts header 126 and 128) before being sent to CH1 105. CH1 105 then writes the data to buffer 111. State machine 123 is used to co-ordinate data transfer in the receive and transmit paths.

Figure 1E:
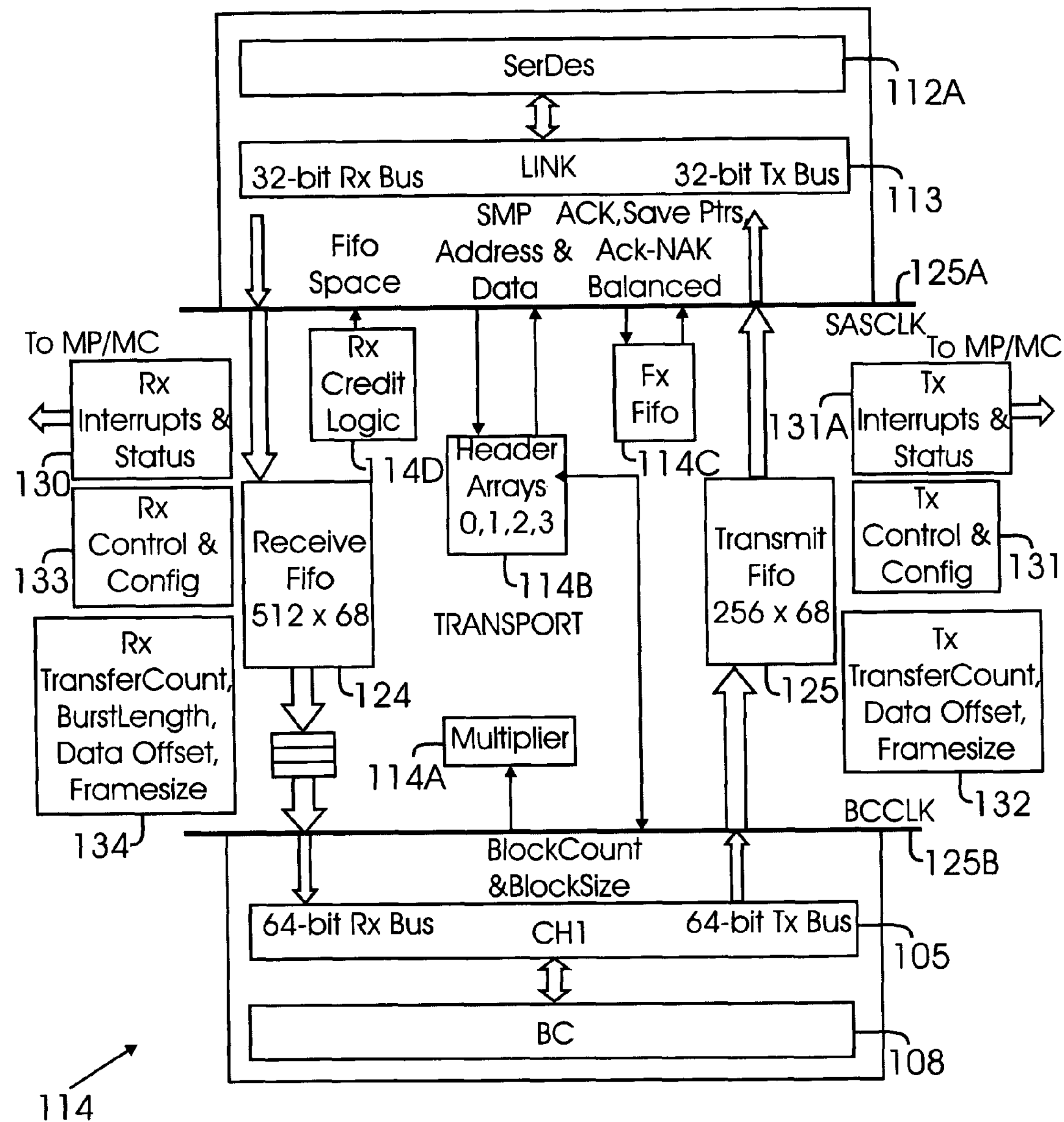
FIG. 1E shows a block diagram of a transport module according to one aspect of the present invention.

FIG. 1E shows a detailed block diagram of transport module 114. Transmit FIFO 125 operates at BCCLK 125B(BC 108 clock) on the input side and SASCLK 125A on the output side. FIFO 125 holds one or more frames with a header, payload and CRC value.

Transport module 114 includes another FIFO on the transmit side, the Fx FIFO 114C. Fx FIFO 114C includes a write pointer, which specifies the entry to use when a new frame is built by transport module 114. Fx FIFO 114C also includes an ACK/NAK pointer ("akptr"). When Link module 113 receives an ACK for a frame, the entry is removed from Fx FIFO 114C and the akptr is increased.

Fx FIFO 114C also includes a "lnkptr" that indicates a frame being sent to link module 113 at a given time. Fx FIFO 114C also includes a pointer for MP 100 to allow microprocessor 100 to inspect and modify the content of the Fx FIFO 114C.

Transport module 114 also include a multiplier 114A that is used for hardware assist when firmware initializes transport module 114 registers; and credit logic 114D (that provides available credit information to Link 113 for received data).

A header array 114B is used for processing data efficiently, as described below in detail, according to one aspect of the present invention.

Transmit module 114 can send interrupts and status 130 to MP 100 (or to MC 102/MC 115) on the receive side. Control and configuration information is shown as 133, while details regarding incoming data (for example, transfer count, burst length, data offset and frame size) is shown as 134.

On the transmit side, interrupts/status are shown as 131A, control/configuration as 131 and outgoing data attributes (for example, transfer count, burst length, data offset and frame size) is shown as 132.

Figure 2:
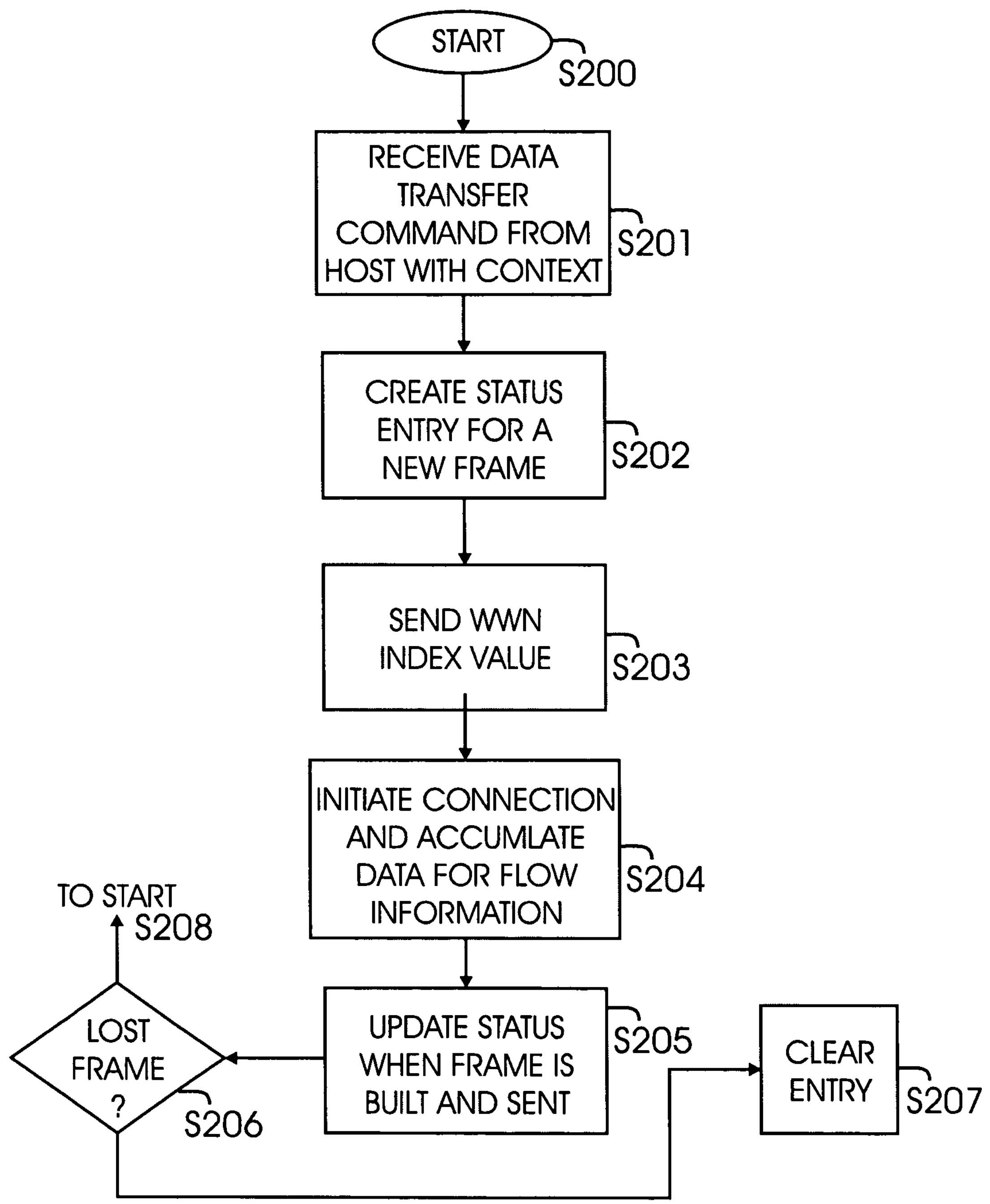
FIG. 2 shows a flow diagram for processing a data transfer command in the transmit path, according to one aspect of the present invention.

Frame Processing:

FIG. 2 shows a flow diagram for processing a data transfer command in the transmit path, according to one aspect of the present invention. In step S200, the process starts and in step S201, a data transfer command is received from a host system via host interface 104A.

In step S202, a status entry is created in Fx FIFO 114C. The entry indicates that a new frame has been created.

In step S203, to reduce latency, WWN index value 129A is sent to link module 113. This allows link module 113 and PHY module 112 to initiate a connection, while the frame is being built.

In step S204, link module 113/PHY 112 initiates a connection and data flow information is accumulated simultaneously. This reduces latency for transmitting frames.

In step S205, when the frame is built, the status is updated in FIFO 114C. The same is performed when the frame is sent.

In step S206, after the frame is sent, the process (MC 115) determines if the frame is lost. This is based on whether the host system indicates that the frame has been received. If the frame is not lost, then in step S207, the entry is vacated for the next frame.

If the frame is lost, then the process starts again. However, frame processing does not have to begin from step S200, instead, the processing is resumed from a known point, since frame status is continuously updated from the time a frame is created to the time it is sent.

MC 115 can tag frames using various identifiers. For example, a frame may be tagged so that link module 113 discards the frame; a frame is tagged as an interlock/non-interlock frame; a frame may be tagged as an error frame; or the last frame is tagged as the "last frame" of a read command.

The foregoing process allows MC 115 to know who requested a frame, where in buffer 111 did the frame come from, how many blocks comprise the frame and all the information used to build the frame (for example, CRC residue, logical block address and offset from the beginning of the block). This information is used to process the frame if the frame is lost and perform diagnostics on a connection.

Figure 3:
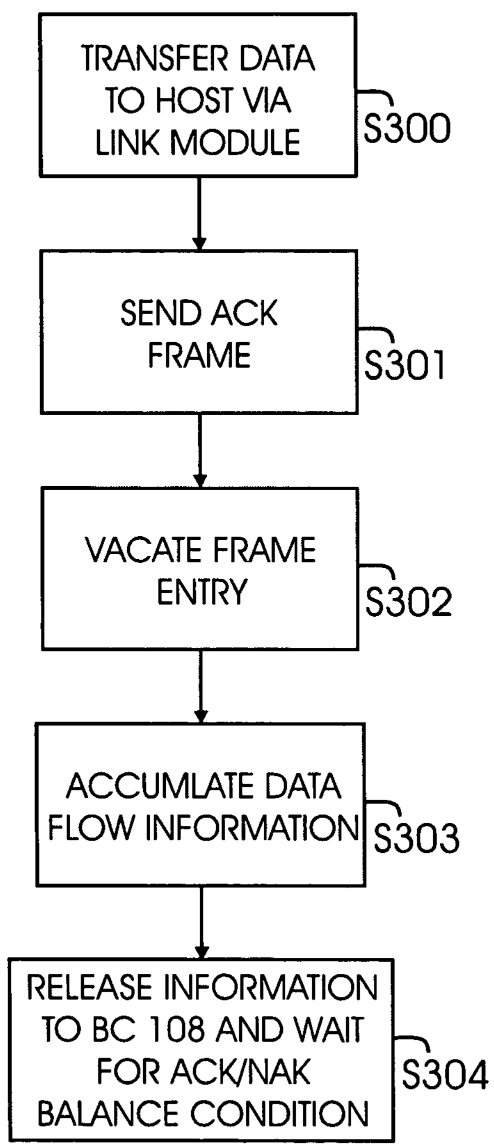
FIG. 3 shows a flow diagram for a link module to acknowledge frame receipt, according to one aspect of the present invention.

Process Flow for Link Module 113 Acknowledging Frame Receipt:

FIG. 3 shows a flow diagram of process steps where after a frame is sent by transport module 114 to link module 113, the link module 113 acknowledges frame receipt so that transport module 114 does not wait for host acknowledgement, until the last frame has been sent in a read command.

In step S300, link module 113 via PHY module 112 transfers frame to a host.

In step S301, link module 113 sends an ACK frame to transport module 114. Transport module 114 considers the ACK to be that from a host. Firmware can enable or disable the mode that allows link module 113 to send an ACK frame. If the link module 113 is not enabled to send an ACK frame, then transport module 114 waits for the host to acknowledge frame receipt (for interlock frames). Thereafter, in step S302, the entry for the transmitted frame in FIFO 125 is vacated.

In step S303, data flow information is stored in a register (not shown). Thereafter, in step S304, data is released to BC 108 and transport module 114 waits for an ACK/NAK balance condition, after the last frame has been transmitted.

Figure 4:
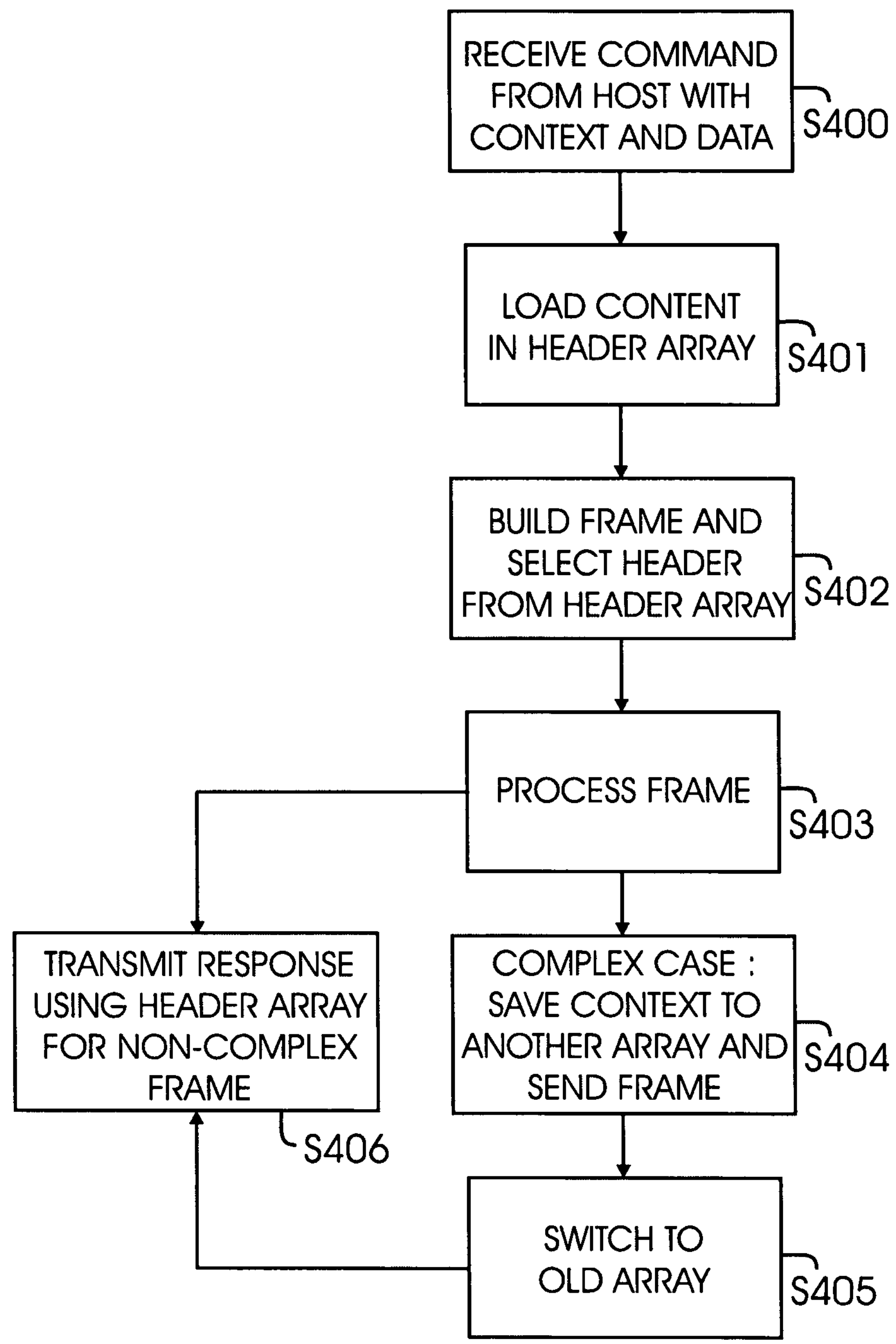
FIG. 4 shows a flow diagram of process steps in the transmit path of a controller, according to one aspect of the present invention.
Figure 6:
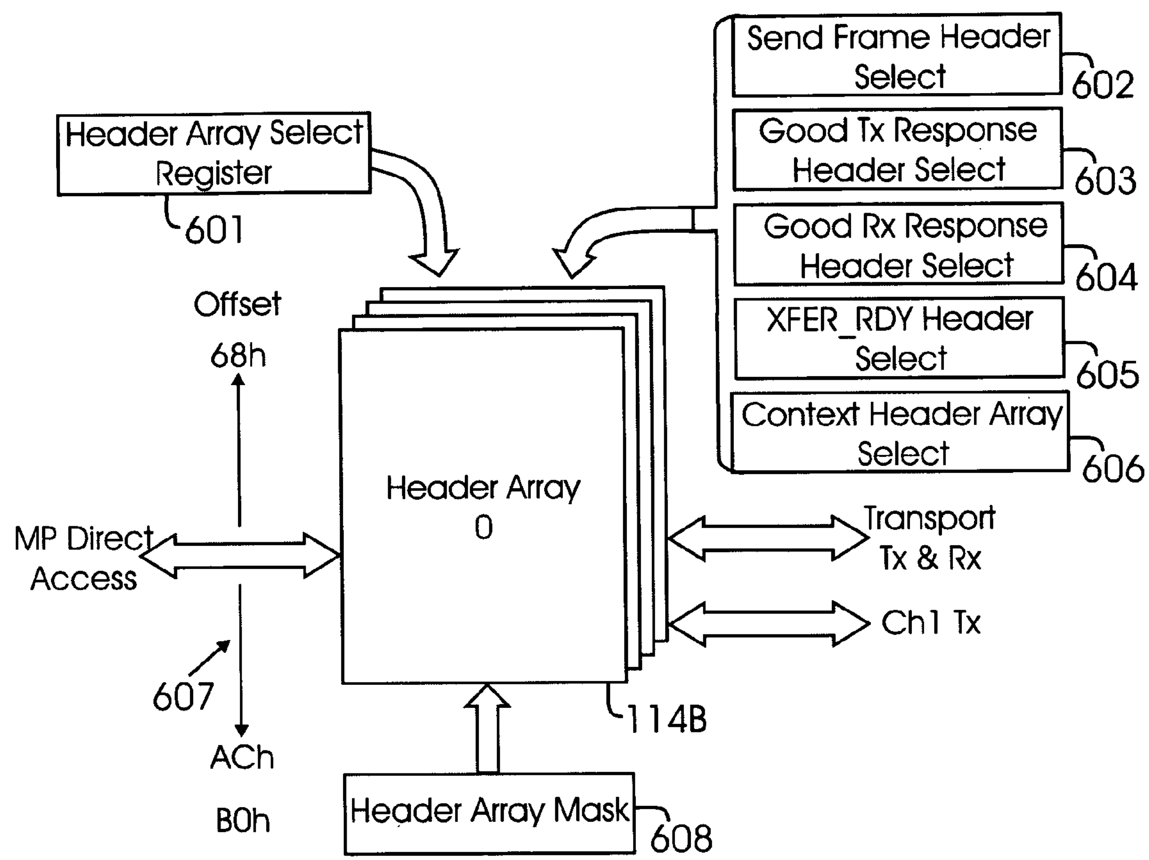
FIG. 6 shows a block diagram for selecting a header array, according to one aspect of the present invention.

FIG. 4 shows a flow diagram of process steps in the transmit path of controller 101. In step S400, receive commands are received from a host. The command includes a context and data. In step S401, the context is loaded in header array 114B (as shown in FIG. 6) by MC 115 or MP 100. In one aspect the header array 114B includes one array element each for receive and transmit processes and two for either context switch or spares. Since initializing a header array can take a significant amount of time, extra (spare) arrays are provided allow the microprocessor 100 firmware to overlap initializing the header array for the next processes while transmission and receiving frames for the current processes.

In step S402, the frame is built and a header row is selected from the header array 114B. This is performed based on command/signal/bit set in register 601.

In step S403, the frame is processed as discussed below with respect to steps S406 and S405. For a non-complex case, for example, where there is no interrupt involved, a response is sent in step S406 using the selected row from header array 114B. For a complex case, in step S404, the context is saved in another header array 114B row and then the frame is sent. Thereafter, after the frame is processed in step S405, the process reverts back to the previous header row (step S406).

It is noteworthy that header array 114B allows firmware to interrupt what is being transmitted at a given time, save the context into the array in a single access, select a new context, process the new context and then revert back to the old context. Header array 114B architecture allows generation of different types of frames using the same array element.

Figure 5:
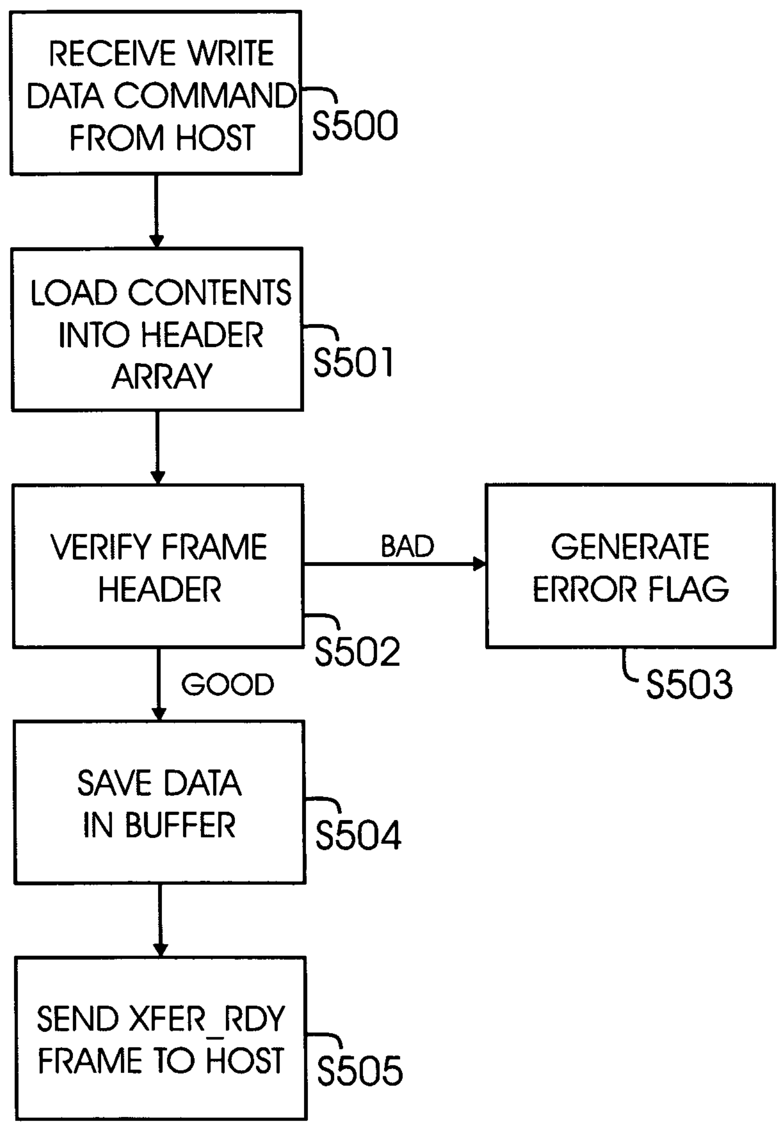
FIG. 5 shows a flow diagram of the receive process using a header array, according to one aspect of the present invention.

FIG. 5 shows a flow diagram of the receive process using header array 114B, according to one aspect of the present invention. In step S500, write data command is received from host. In step S501, MC 115 or MP 100 loads the context into header array 114B. In step S502, frame header is verified. If the frame header cannot be verified, then an error flag is set in step S503.

If the frame header can be verified, then in step S504, data is saved in buffer 111. Thereafter, in step S505, a XFER-RDY signal is sent to the host.

It is noteworthy that a receive operation is split into different bursts paced by the recipient. Header array 114B can save a current context of a receive operation at the beginning of each burst to allow for retries, in case of errors.

It is noteworthy that the transmit and receive processes may use the same or different array elements. While one or two array elements are actively processed at a given time, MP 100 may process other elements for future processing and thus improve overall controller 101 performance.

Header Array 114B:

As shown in FIG. 6, header array 114B has plural rows/layers and one row is selected by signal/command/bit generated from header select register 601. Array addresses are shown as 607.

Various commands/signal/bit (used interchangeably) values, 602-606, are used for processing both receive and transmit operations. For example, when all the data for the write command is received by controller 101, a "Good Rx" response frame is selected by 604. "XFER_RDY" frame is selected by 605, when all data for a burst has been written in buffer 111. A frame header is selected by 602 and a "Good Tx" response is selected by 603 for data frame transmission. Context header array (row) is selected by bit 606 after a frame is received and the context is checked, based on the selected array.

Header array mask 608 is used for determining which information in a header participates in context save and retrieve operations.

FIG. 7 shows header array 114B contents including control context, header context, transfer context, flow control context and input/output context.

The header array architecture of FIG. 6 allows controller 101 to efficiently manage frame headers both on transmit and receive paths. Headers are built ahead in an array, plural headers may be generated for a single connection and incoming headers are checked using an expected header array 114B.

Although the present invention has been described with reference to specific embodiments, these embodiments are illustrative only and not limiting. Many other applications and embodiments of the present invention will be apparent in light of this disclosure.

What is claimed is:

1. A controller for a storage device associated with a host, the controller comprising:

a host interface to i) receive read commands, write commands, and first data to be stored on the storage device from the host, and ii) transmit second data stored on the storage device to the host;

and a Serial Attached Small Computer Interface (SAS) module located on the controller, wherein the SAS module transfers the first data and the second data between the storage device and the host interface, and wherein the SAS module includes a transport module to i) receive the second data from the storage device, ii) build a data frame based on the second data, wherein the data frame corresponds to an interlock frame requiring an acknowledgement from the host prior to processing subsequent data frames, and a link module to receive the data frame from the transport module, transfer the data frame to the host interface to be transmitted from the controller to the host, and in response to transferring the data frame to the host interface, selectively operate in (i) a first mode when the first mode is enabled by firmware and (ii) a second mode when the first mode is disabled by the firmware, wherein when the first mode is enabled, the link module operates in the first mode to i) generate an acknowledgment frame acknowledging receipt of the data frame by the host independently of either the host or another device external to the controller generating and sending the acknowledgment frame, and ii) transmit the acknowledgement frame to the transport module, and when the first mode is disabled, the link module operates in the second mode to wait for the host to generate and transmit the acknowledgment frame to be received by the SAS module via the host interface.

2. The controller of claim 1, wherein the transport module notifies the link module that the data frame is being built prior to completing the building of the data frame.

3. The controller of claim 2, wherein the link module initiates a connection with a physical layer module in response to being notified that the data frame is being built.

4. The controller of claim 1, wherein the transport module stores a status entry for the data frame, and wherein the status entry is configurable to indicate i) that the data frame is being built, ii) that the building of the data frame is complete, and iii) that the data frame was transmitted from the SAS module.

5. The controller of claim 4, wherein the SAS module determines whether the data frame is lost, and i) if the data frame is lost, continues at least one of building and transmitting the frame based on the status entry, and ii) if the data frame is not lost, clears the status entry.

6. The controller of claim 5, wherein determining whether the data frame is lost includes determining whether the data frame is lost based on whether the acknowledgement frame was received.

7. The controller of claim 1, wherein the SAS module tags the data frame with an identifier that indicates whether transmission of the data frame requires an acknowledgement frame from the host.

8. The controller of claim 1, wherein the data frame includes a field that indicates whether the data frame requires an acknowledgement frame from the host.

9. A method of operating a controller for a storage device associated with a host, the method comprising:

using a host interface, receiving read commands, write commands, and first data to be stored on the storage device from the host, and transmitting second data stored on the storage device to the host; and using a Serial Attached Small Computer Interface (SAS) module located on the controller, transferring the first data and the second data between the storage device and the host interface, receiving the second data from the storage device, building a data frame based on the second data, wherein the data frame corresponds to an interlock frame requiring an acknowledgement from the host prior to processing subsequent data frames, transferring the data frame to the host interface to be transmitted from the controller to the host, and in response to transferring the data frame to the host interface, selectively operating in (i) a first mode when the first mode is enabled by firmware and (ii) a second mode when the first mode is disabled by the firmware, wherein when the first mode is enabled, operating in the first mode to i) generate an acknowledgment frame acknowledging receipt of the data frame by the host independently of either the host or another device external to the controller generating and sending the acknowledgment frame, and ii) transmit the acknowledgement frame to the transport module, and when the first mode is disabled, operate in the second mode to wait for the host to generate and transmit the acknowledgment frame to be received by the SAS module via the host interface.

10. The method of claim 9, further comprising generating a notification that the data frame is being built prior to completing the building of the data frame.

11. The method of claim 10, further comprising initiating a connection with a physical layer module in response to the notification that the data frame is being built.

12. The method of claim 9, further comprising storing a status entry for the data frame, wherein the status entry is configurable to indicate i) that the data frame is being built, ii) that the building of the data frame is complete, and iii) that the data frame was transmitted from the SAS module.

13. The method of claim 12, further comprising:

determining whether the data frame is lost;

if the data frame is lost, continuing at least one of building and transmitting the frame based on the status entry; and if the data frame is not lost, clearing the status entry.

14. The method of claim 13, wherein determining whether the data frame is lost includes determining whether the data frame is lost based on whether the acknowledgement frame was received.

15. The method of claim 9, further comprising tagging the data frame with an identifier that indicates whether transmission of the data frame requires an acknowledgement frame from the host.

16. The method of claim 9, wherein the data frame includes a field that indicates whether the data frame requires an acknowledgement frame from the host.

* * * * *